Jan. 15, 1957  A. P. CLOES  2,777,707
RETRACTABLE GOLF CART SEAT
Filed May 20, 1954  2 Sheets-Sheet 1
FIG—1
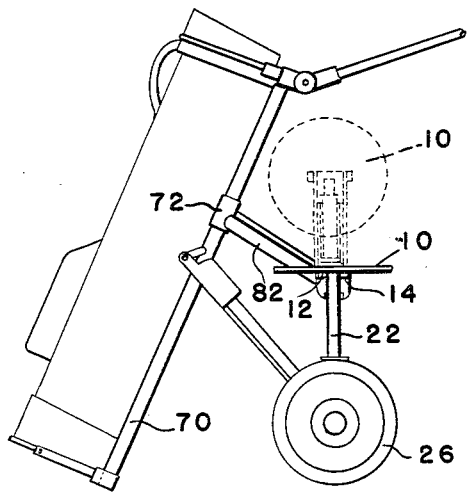
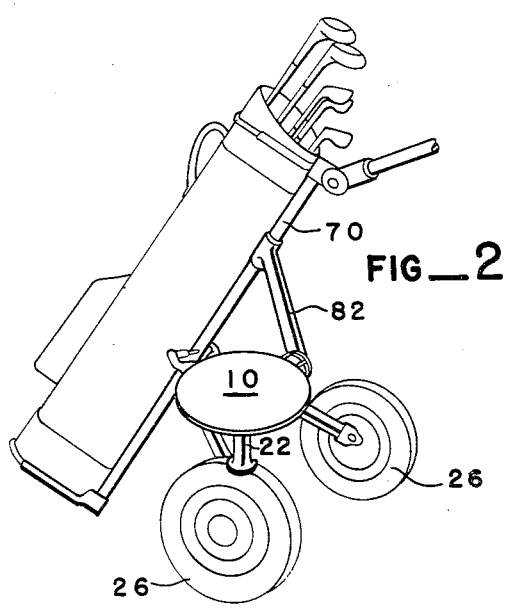
FIG—2
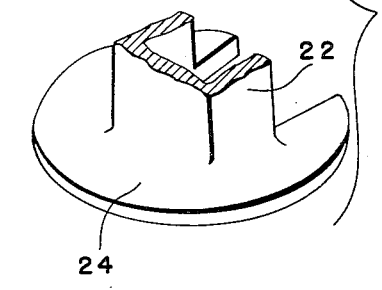
FIG—3
ALBERT P. CLOES
*INVENTOR.*
BY *Smith & Tuck*

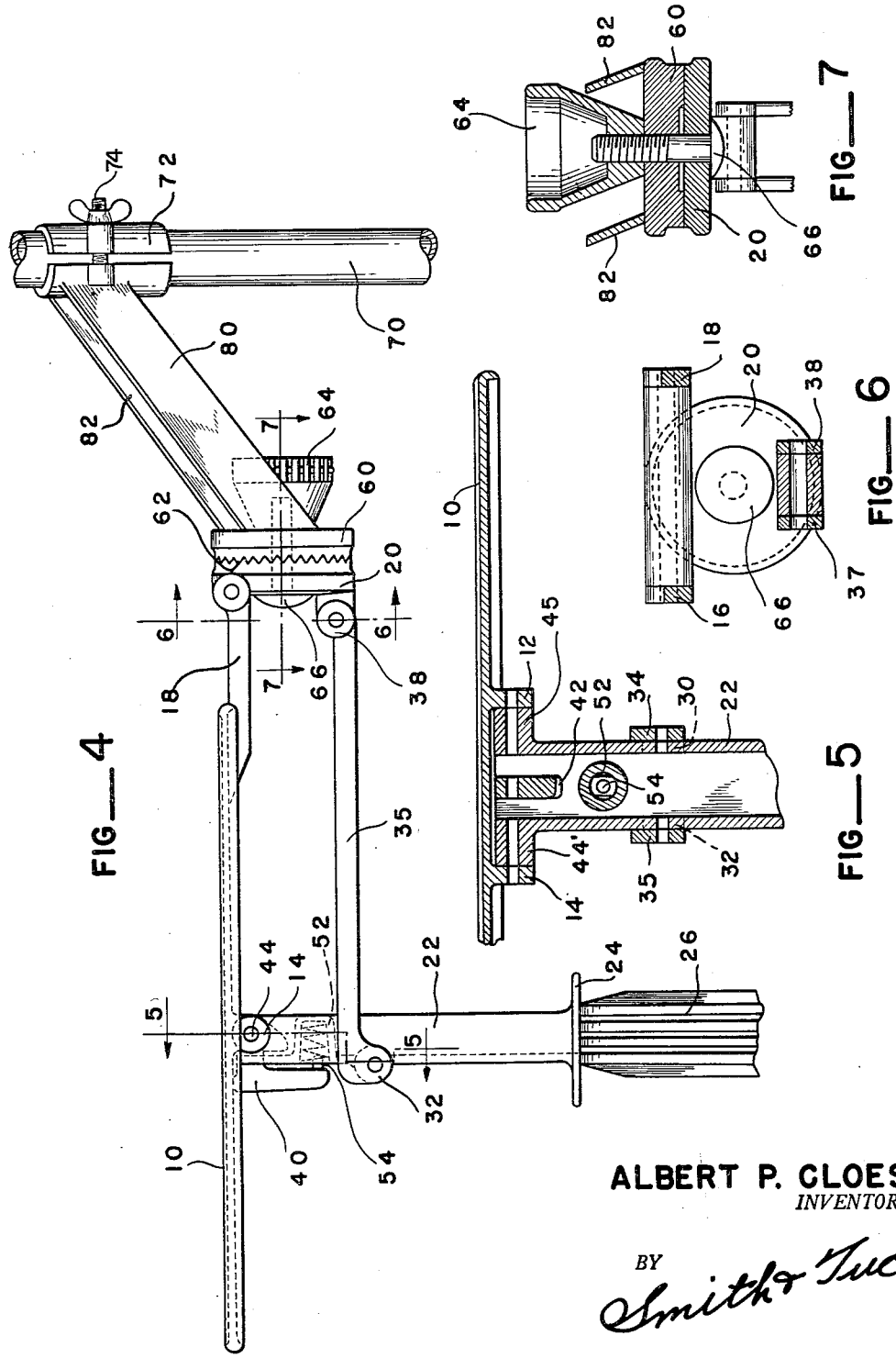

United States Patent Office 2,777,707
Patented Jan. 15, 1957

2,777,707

RETRACTABLE GOLF CART SEAT

Albert P. Cloes, Seattle, Wash.

Application May 20, 1954, Serial No. 431,103

4 Claims. (Cl. 280—36)

My present invention relates to the general art of golf carts and more particularly to a retractable golf cart seat which is attached to the cart and always available when needed.

The general scarcity of golf caddies has greatly increased the use of the golf bag cart, and with this change on the part of the playing public, there are often considerable delays while each player performs the duties that formerly would normally be carried out by an experienced caddy. There are many other reasons, many of them long-standing, which cause delays in the progress of golf players around a well-patronized course, and it has therefore become increasingly desirable that a player have a seat readily available to him so that he may rest during periods of inactivity. This present invention is to provide a seat for this purpose. Many attempts have been made in the past to provide a usable seat for employment on the golf course but those that have been observed are either insecure or inadequate or they achieve full utility by virtue of considerable complication which makes them a heavy, bulky unit. Thus the preparation of the seat of this order for use, or when the use is finished, the restoration of the seat to the carrying position, involves considerable effort. In this present invention it is believed that many of the deficiencies of golf cart seats whch have been observed have been overcome and a unit provided that is light in weight, easily folded into a position out of the way when it is not in use, and because of its simplicity of construction, one which can be made and sold at a fair price so that the bulk of the golfers can well afford to provide themselves with this convenient accessory.

The principal object of this present invention is therefore to provide a golf cart seat which is readily adaptable to the wide variety of golf carts and which is light in weight and convenient to use.

A further object of this invention is to provide a golf cart seat that is readily adjustable to various positions, and will, because of its sturdy structure, support a seat of adequate size to be comfortable.

A further object of this invention is to provide a golf cart seat that is automatically retractable from the cart wheel which serves as a support therefor.

A further object of this invention is to provide a golf cart seat in which the supporting member engages the upper portion of the tire of one of the wheels of the cart in a position to lock the same against rotation and to thus insure a stable base for the seat.

Further objects, advantages and capabilities will be apparent from the description and disclosure in the drawings, or may be comprehended or are inherent in the device.

In the drawings:

Figure 1 is a side elevation of a typical golf cart, in use, with my golf cart seat shown in full line position and also shown in its folded position by dashed lines;

Figure 2 is a perspective view illustrating the manner of using my golf cart seat and illustrating how the same is supported;

Figure 3 is a bracketed view, partly in section, and illustrating in fragmentary form certain of the parts which support the golf cart seat and insure its being retracted from engagement with the tire of the cart wheel when it is no longer in active use;

Figure 4 is a side elevation of the principal parts making up my golf cart seat with the wheel of the golf cart and one of the structural members of the cart shown in fragmentary form;

Figure 5 is a fragmentary, cross-sectional view along the broken vertical plane of line 5—5 of Figure 4;

Figure 6 is a vertical sectional view taken along the line 6—6 of Figure 4; and

Figure 7 is a horizontal sectional view taken along the line 7—7 of Figure 4.

Referring more particularly to the disclosure in the drawings, the numeral 10 designates the seat proper of my device. This I prefer to form as a casting of light weight metal. Near its center, seat 10 is provided with well-spaced pivot lugs 12 and 14. At one end seat 10 is provided with spaced supporting bars 16 and 18 which are pivotally secured to the revolvable swivel members 20. It is desired to point out that lugs 12 and 14 and bars 16 and 18 are given considerable spacing to the end that maximum security and stiffness will be provided in the supporting of seat 10. In use, seat 10 is principally supported by the vertical strut 22. In cross section strut 22 is formed as with a channel section as will be noted particularly in Figure 3. The purpose of this is twofold; one to give maximum rigidity from a light weight casting and secondly to provide a housing for certain of the associated parts used therewith. At its lower ends strut 22 is provided with a foot portion 24 which is adapted to engage the tire 26 of one of the golf bag cart wheels.

Intermediate its ends strut 22 is provided with a second pair of spaced pivot lugs as 30 and 32. To these lugs are pivotally secured the positioning arms 34 and 35. The opposite ends of arms 34 and 35 are pivotally secured to lugs 37 and 38 which are also formed as part of the swivel member 20. Attention is invited to the fact, which is illustrated in Figure 4, that lugs 18 and 38 and 14 and 32 and their companion lugs, which are hidden from view in this figure, are disposed in a parallelogram arrangement substantially. With such an arrangement, when the seat is lifted bodily to its vertical position, strut 22 will be moved to a position adjacent the same and parallel thereto, making a compact nested arrangement which makes the same lie close to the bag and thus out of the way in transporting and in storing the cart.

It has been found that many times it is quite convenient to leave seat 10 substantially in its position for use as the player moves from one stroking position to another. It is however very necessary to have the bearing pad 24 raised up from contact with tire 26 and this is achieved through the bell crank 40 and its associated parts. Bell crank 40 is shown in Figures 3, 4, and 5 and is held in position by being located in slot 42 formed in strut 22 and pivots about pin 44 which passes through the seat lugs 12 and 14 and the extended lugs 44 and 45 of strut 22. The upper leg of lever 40, as 46, is provided with an upwardly extending boss 48 which is arranged to contact the under side of seat 10 and thus in effect to be contacting the upper lever of the seat support means wihch comprises the seat member 10 itself and the two spaced bars 16 and 18. The lower leg 49 of lever 40 is arranged to contact the compression spring 50 which spring is held in place by virtue of the pocket-like seat 52 formed in strut 22 and the outstanding lug 54 formed as part of leg 49. When a person sits on seat 10, his weight overcomes spring 50 and strut 22 is pressed downwardly until the foot portion thereof, 24, forms a secure engagement with tire 26. When the user, however, moves off of seat 10, spring 50 revolves the bell crank 40 about pivot pin 44 and causes lug 48 to bear on the under side of seat 10. This action in effect changes the angle between strut 22 and seat 10 and in so doing causes the whole assembly to move upwardly about pivots 18 and 38. The amount of this movement is of course a function of proportion of the parts. The basic requirement is only that reasonable clearance be provided between foot portion 24 and tire 26 and to this end a downwardly extending stop lug 56 is provided which after bell crank 40 has been caused to revolve a sufficient amount to provide clearance for tire 26, abuts the inner surface of the web forming part of strut 22 and arrests any further movement. One desirable result of this limiting of the movement is that the usable extension of spring 50 is not exceeded and therefore the same is retained by the retaining means provided in cup 52 on the centering lug 54.

Adapted to coact with the movable swivel member 20 is the fixed swivel member 60. It has been found preferable to have the engagement between members 20 and 60 provided with a ring of radially disposed teeth as 62, the form shown in Figure 4 being excellent for this purpose. To make an angular adjustment between the seat, to which the movable member 20 is pivotally secured and the fixed member 60, the barrel nut 64 is unscrewed sufficiently from bolt 66 so that the teeth of the two coacting members may pass each other and be thus reengaged in a new position at the desired angular adjustment, after which nut 64 is again tightened and the angular relationship will be maintained.

Various golf bag carts are actually of somewhat different structural form but the present most acceptable types are made of tubing and normally have one or more principal supporting members. Throughout the various figures of the drawings a form of cart is indicated in which a single tubular member 70 is employed. It is then necessary to provide a clamp member as 72 which will operatively engage tube 70 and to then provide joining and supporting means between swivel member 60 and clamp member 72. In this present showing, a preferred arrangement is indicated in which parallel but spaced structural members as 80 and 82 are provided, each of these members being fixedly secured at their opposite ends to member 60 and clamp member 72 respectively. For a tubular frame the divided sleeve clamp, secured by bolts 74 is very effective. On other forms of carts a suitable clamp 72 should be employed.

It is believed that it will be clearly apparent from the above description and the disclosure in the drawings that the invention comprehends a novel construction of a retractable golf cart seat;

Having thus disclosed the invention, I claim:

1. A retractable golf cart seat to attach to a longitudinal structural member of a golf bag cart and to rest on a wheel of the cart, comprising: a cantilevered supporting arm clamped at one end to said longitudinal member and extending generally in the direction of said wheel; a base member secured to the other end of said supporting arm; a first upper pivoting arm having one end pivotally connected to said base member and carrying at its other end a seat located over said wheel; an upright strut having its upper end pivotally connected to said seat and a second lower pivoting arm having one end pivotally connected to the intermediate portion of said strut and having its other end pivotally connected to said base member below the point of pivotal connection of said first pivoting arm, whereby the pivots between said pivoting arms, said base member and said strut form a substantially parallelogrammatic outline; the lower end of said strut being in position to rest on said wheel and to lock the wheel in place under the weight of a user; means to normally bias said strut upward to a point above said wheel formed by a bell crank having one arm pivotally connected to the upper end of said strut at the point of pivotal connection with said seat and having its intermediate portion bearing on said seat outward of said strut and spring compression means between the other arm of said bell crank and the adjacent wall of said strut thereby providing force biasing said strut upward.

2. The subject matter of claim 1 in which there are stop means between the first arm of said bell crank and said strut limiting the upward biasing moment of the spring means on said strut.

3. A retractable golf cart seat to attach to a longitudinal structural member of a golf bag cart and to rest on a wheel of the cart, comprising: a cantilevered supporting arm clamped at one end to said longitudinal member and extending generally in the direction of said wheel; a base member secured to other end of said supporting arm; a first upper pivoting arm having one end pivotally connected to said base member and carrying at its other end a seat located over said wheel; an upright strut having its upper end pivotally connected to said seat and a second lower pivoting arm having one end pivotally connected to the intermediate portion of said strut and having its other end pivotally connected to said base member below the point of pivotal connection of said first pivoting arm, whereby the pivots between said pivoting arms, said base member and said strut form a substantially parallelogrammatic outline; the lower end of said strut being in position to rest on said wheel and to lock the wheel in place under the weight of a user; said base member including a pair of juxtaposed discs having opposed engageable teeth and manually adjustable tension means therebetween so that they may be secured in various adjusted positions relative a common substantially horizontal axis, a first of said discs being fixedly secured to said supporting arm and the second disc having bearings thereon for pivotal connection with said pivoting arms whereby said seat may be tilted relative the horizontal by adjustment of the position of said second disc.

4. A retractable golf cart seat to attach to a structural member of a golf bag cart and to rest on a wheel of the cart, comprising: a cantilevered supporting arm clamped at one end to said structural member and extending generally in the direction of said wheel; a base member secured to the other end of said supporting arm; paired, juxtaposed upper pivoting arms each having one end pivotally connected to said base member and carrying at its other end a seat located over said wheel; an upright strut having its upper end pivotally connected to said seat and paired, juxtaposed lower pivoting arms each having one end pivotally connected to the intermediate portion of said strut and having its other end pivotally connected to said base member below the points of pivotal connection of said upper pivoting arms, whereby the pivots between said pivoting arms, said base member and said strut form a substantially parallelogrammatic outline; the lower end of said strut being in position to rest on said wheel and to lock the wheel in place under the weight of a user; and the upper pivoting arms being more closely spaced together than the lower pivoting arms whereby the seat may be pivoted to a substantially upright position in which the upper and lower pivoting arms are interfolded.

References Cited in the file of this patent

UNITED STATES PATENTS

| Number | Name | Date |
| --- | --- | --- |
| 1,318,439 | Erickson | Oct. 14, 1919 |
| 1,652,100 | Eastburn | Dec. 6, 1927 |
| 1,796,949 | Huntley | Mar. 17, 1931 |
| 2,536,572 | Sather | Jan. 2, 1951 |
| 2,610,072 | Head | Sept. 9, 1952 |
| 2,652,880 | Gundersen | Sept. 22, 1953 |
| 2,673,589 | Kunkel | Mar. 30, 1954 |